(12) United States Patent
Boulton

(10) Patent No.: US 11,297,089 B2
(45) Date of Patent: Apr. 5, 2022

(54) PROVIDING SECURE SENSOR DATA TO AUTOMATED MACHINES

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 290 days.

(21) Appl. No.: 15/969,386

(22) Filed: May 2, 2018

(65) Prior Publication Data
US 2019/0342322 A1 Nov. 7, 2019

(51) Int. Cl.
*H04L 29/06* (2006.01)
*G01S 19/13* (2010.01)
*H04L 67/12* (2022.01)

(52) U.S. Cl.
CPC .......... *H04L 63/1433* (2013.01); *G01S 19/13* (2013.01); *H04L 67/12* (2013.01)

(58) Field of Classification Search
CPC ............... H04L 63/1433; H04L 67/12; H04W 12/00506; H04W 12/00505; H04W 12/00503; H04W 12/00512; H04W 12/009; H04W 12/67; H04W 12/71; H04W 12/66; H04W 12/63; G01S 19/13; G01S 19/14; G05D 1/0088
See application file for complete search history.

(56) References Cited

U.S. PATENT DOCUMENTS

| | | | |
|---|---|---|---|
| 7,260,844 B1 * | 8/2007 | Tidwell | G06F 21/577 726/22 |
| 7,890,483 B1 * | 2/2011 | Aaron | H04L 67/12 707/705 |
| 7,926,113 B1 * | 4/2011 | Gula | H04L 63/1425 726/25 |
| 9,946,531 B1 * | 4/2018 | Fields | A61B 5/6893 |
| 10,019,299 B2 * | 7/2018 | Park | G06F 11/008 |
| 10,257,647 B2 * | 4/2019 | Kordybach | H04W 4/46 |
| 10,382,556 B2 * | 8/2019 | Ferre | G05B 15/02 |
| 10,503,908 B1 * | 12/2019 | Bellis | G06F 16/9032 |

(Continued)

FOREIGN PATENT DOCUMENTS

| WO | WO 2017/046805 | 3/2017 |
|---|---|---|
| WO | WO 2017/079321 | 5/2017 |

OTHER PUBLICATIONS

CVE Details, "CVSS Score Distribution For Top 50 Products By Total Number of Distinct Vulnerabilities", https://www.cvedetails.com/top-50-product-cvssscore-distribution.php, date Feb. 1, 2012 from "About & Contact" p. 2 pages (Year: 2012).*

(Continued)

*Primary Examiner* — Carl G Colin
*Assistant Examiner* — Han Yang
(74) *Attorney, Agent, or Firm* — Fish & Richardson P.C.

(57) ABSTRACT

Systems, methods, and software can be used to provide secure sensor data. In some aspects, a computer-implemented method includes: receiving, at a sensor security evaluation application executing on a device, sensor data from a sensor on the device; determining, by the sensor security evaluation application, a security confidence score associated with the sensor data; and transmitting, from the sensor security evaluation application, the security confidence score and the sensor data to a smart machine processor on the device.

15 Claims, 2 Drawing Sheets

(56) References Cited

U.S. PATENT DOCUMENTS

| | | | | |
|---|---|---|---|---|
| 10,754,958 | B1* | 8/2020 | Sidagni | G06F 21/577 |
| 2006/0079208 | A1* | 4/2006 | Kim | H04L 67/12 |
| | | | | 455/412.1 |
| 2010/0325412 | A1* | 12/2010 | Norrman | G06Q 10/06 |
| | | | | 713/100 |
| 2015/0332054 | A1* | 11/2015 | Eck | H04L 63/1433 |
| | | | | 726/25 |
| 2017/0195298 | A1* | 7/2017 | Brand | H04L 63/0442 |
| 2019/0036946 | A1* | 1/2019 | Ruvio | B60R 25/00 |
| 2019/0098088 | A1* | 3/2019 | Baltar | H04L 67/12 |
| 2019/0102564 | A1* | 4/2019 | Li | G06N 5/045 |
| 2020/0062250 | A1* | 2/2020 | Boulton | B60W 30/0956 |

OTHER PUBLICATIONS

Markus Miettinen, "IOT SENTINEL: Automated Device-Type Identification for Security Enforcement in IoT", Dec. 2016, arXiv: 1611.04880v2 [cs.CR] in https://arxiv.org/abs/1611.04880, 11 pages (Year: 2016).*

PCT International Search Report and Written Opinion issued in International Application No. PCT/EP2019/059926 dated May 29, 2019, 13 pages.

* cited by examiner

PROVIDING SECURE SENSOR DATA TO AUTOMATED MACHINES

TECHNICAL FIELD

The present disclosure relates to providing secure sensor data to automated machines.

BACKGROUND

In some implementations, an automated machine can include one or more sensors. The input data from sensors can be processed at the automated machine, e.g., by one or more processors on the automated machine, to generate operating commands. These operating commands can direct the automated machine to execute various actions. One example of the automated machine is a vehicle including an autopilot processing platform. The vehicle can include sensors such as cameras, microphones, laser, radar, ultrasonic, light detection and ranging (LIDAR), Global Positioning System (GPS) or other location determination devices. The autopilot processing platform may receive inputs from these sensors and generate autopilot commands. These autopilot commands are directed to components of the vehicle to control the movements or status of the vehicle. Examples of the components include steering wheel, brakes, accelerator, light, and the like. Examples of the autopilot commands include accelerate, decelerate, turn left or right, signal, and the like. A vehicle equipped with the autopilot processing platform can be referred to as a self-driving vehicle, a driver-less vehicle, an autonomous or semi-autonomous vehicle, or an autopilot vehicle. Other examples of the automated machine include: automated manufacturing equipment, smart appliance, security surveillance equipment, and other devices performing automated control functions based on inputs from sensors.

DESCRIPTION OF DRAWINGS

Like reference numbers and designations in the various drawings indicate like elements.

DETAILED DESCRIPTION

In some cases, the security of the automated machine may be compromised if one of the sensors is compromised. For example, a sensor, e.g., a camera, on a vehicle may be infected by malware. The malware can generate false input data to the autopilot processing platform of the vehicle, which may lead the autopilot processing platform to generate erroneous driving commands. Such security breach may affect the driving safety of the vehicle, and other vehicles or people on the road.

Figure 1:
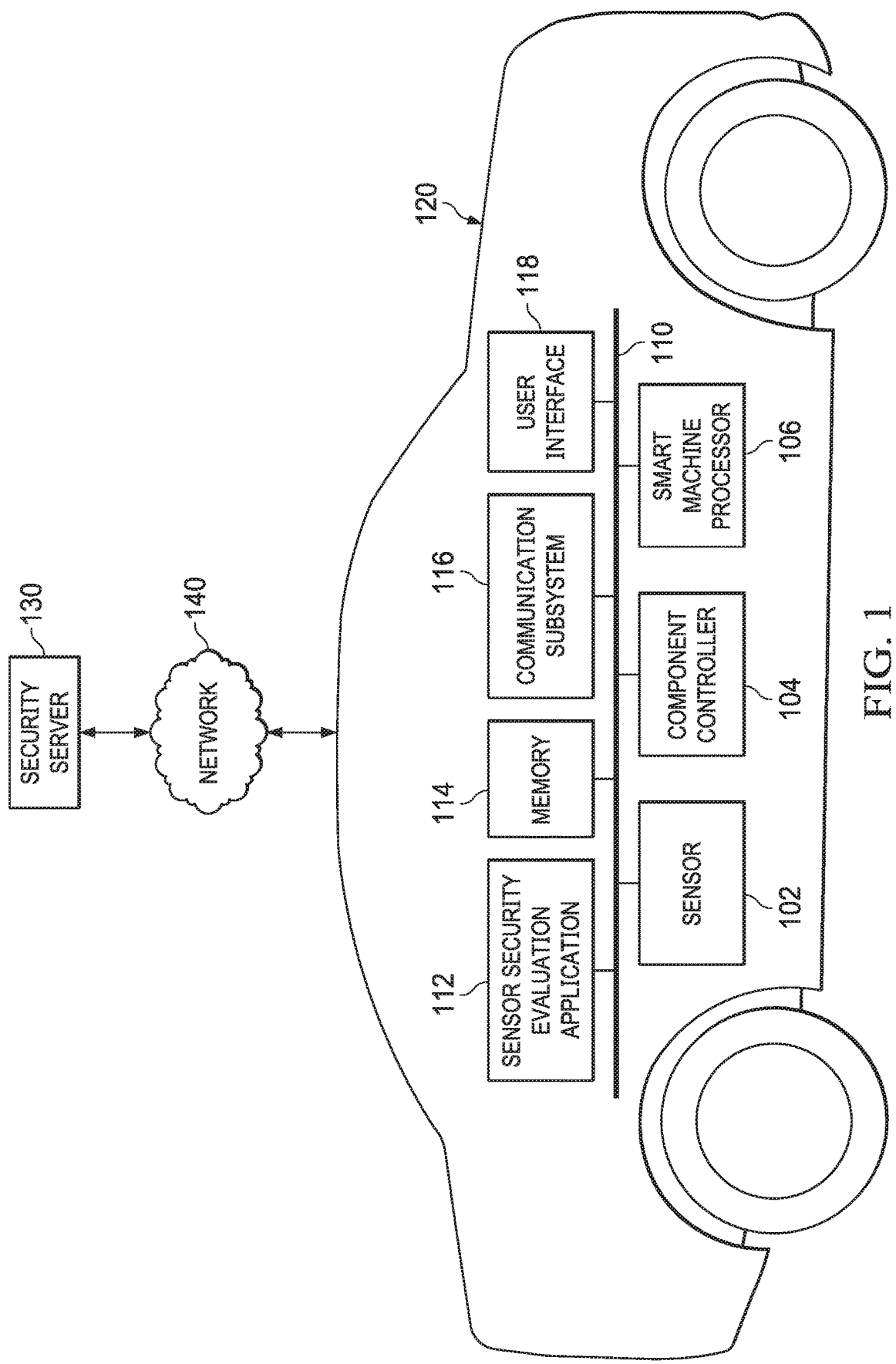
FIG. 1 is a schematic diagram showing an example communication system that provides secure sensor data, according to an implementation.
Figure 2:
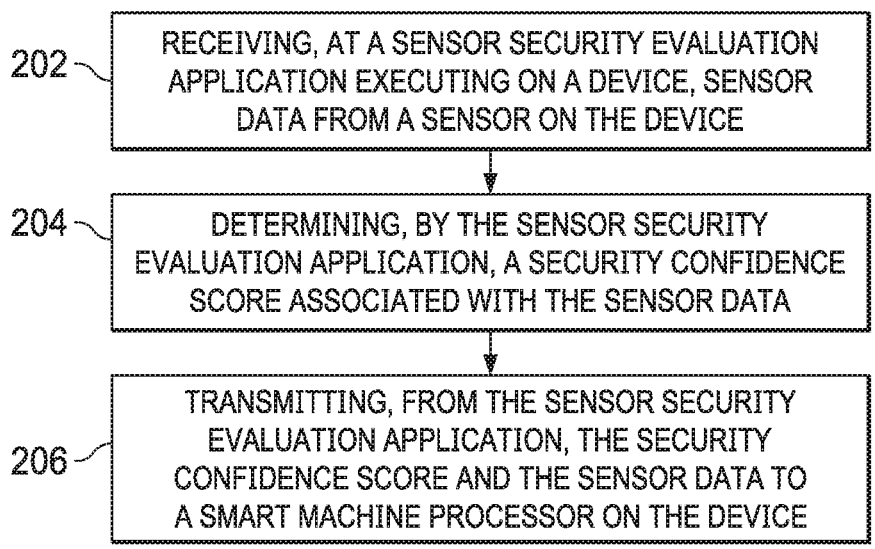
FIG. 2 is a flow diagram showing an example method for providing secure sensor data, according to an implementation.
Figure 3:
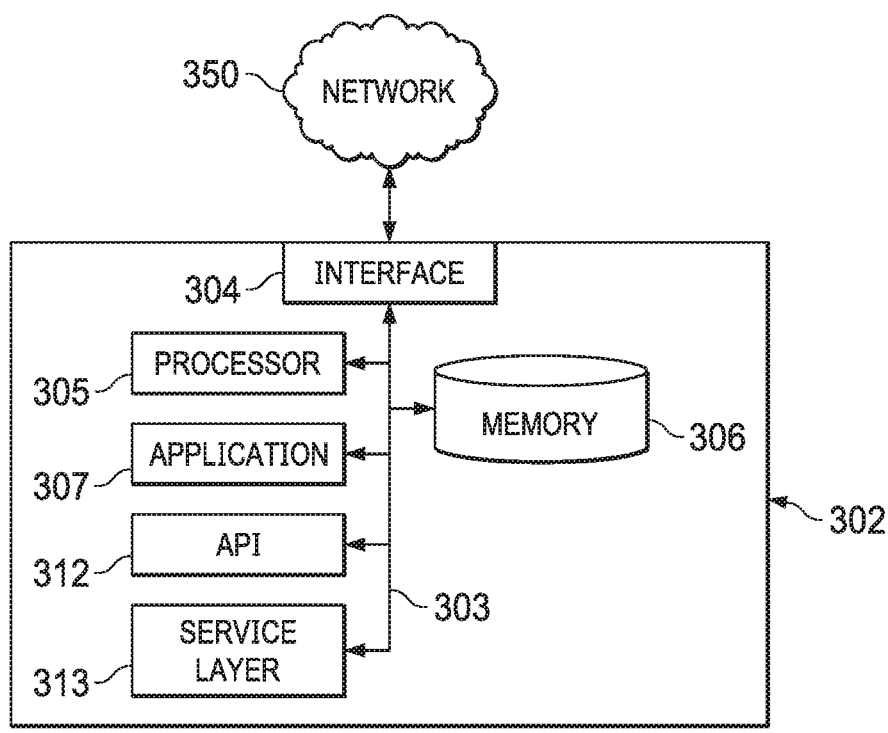
FIG. 3 is a high-level architecture block diagram showing a server coupled with a network, according to an implementation.

In some implementations, the sensor data can be associated with a security confidence score. The security confidence score can be determined based on one or more factors. The factors can include a vulnerability factor that indicates the level of vulnerability to security risks associated with the sensor that produces the sensor data, a location factor that indicates the level of vulnerability to security risks associated with the current location of the device, a staleness factor that indicates the level of vulnerability to security risks associated with the software release data of the sensor. The security confidence score is provided to the automated machine processing platform along with the sensor data. The automated machine processing platform can thus differentiate the sensor data based on their security risks, and generate operating commands accordingly. FIGS. 1-3 and associated descriptions provide additional details of these implementations.

FIG. 1 is a schematic diagram showing an example communication system 100 that provides secure sensor data, according to an implementation. At a high level, the example communication system 100 includes a vehicle 120 that is communicatively coupled with a security server 130, over a network 140.

The security server 130 represents an application, a set of applications, software, software modules, hardware, or any combination thereof that can be configured to provide security data to the vehicle 120. For example, the security server 130 can maintain and update vulnerability data for different components of the vehicle 120. The security server 130 can receive a query from the vehicle 120 for vulnerability data associated with a sensor on the vehicle 120, and include the vulnerability data in a response to the vehicle 120. FIGS. 2-3 and associated descriptions provide additional details of these implementations.

The example communication system 100 includes the network 140. The network 140 represents an application, set of applications, software, software modules, hardware, or combination thereof that can be configured to transmit data messages between the entities in the system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

The vehicle 120, can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising.

In the illustrated example, the vehicle 120 includes a sensor 102, a component controller 104, a smart machine processor 106, a communication subsystem 116, a user interface 118, memory 114, and a sensor security evaluation application 112 that are connected to a bus 110.

The vehicle 120 includes a sensor 102. Although illustrated as a single sensor 102 in FIG. 1, the vehicle 120 can include two or more sensors 102. The sensor 102 can include any device that detects or measures information for the vehicle 120. For example, the sensor 102 can include devices that capture environmental information that is external to the vehicle 120, such as microphones, cameras, radars, laser transmitters and receivers, LIDAR, GPS, or the like. These sensors can provide environmental inputs for a driving processing platform operating on the vehicle 120 to make autopilot decisions. The sensor 102 can also include devices that capture information that is internal to the vehicle 120, such as monitors for components such as engine, battery, fuel, electronic system, cooling systems and the like. These sensors can provide operation status and warnings to the driving processing platform operating on the vehicle 120.

The vehicle 120 includes a component controller 104. Although illustrated as a single component controller 104 in FIG. 1, the vehicle 120 can include two or more component controllers 104. The component controller 104 represents a controller that controls the operation of a component on the vehicle 120. Examples of the components can include engine, accelerator, brake, radiator, battery, steering wheel, transmission system, cooling system, electrical system, or any other components of the vehicle 120. The component controller 104 can operate a respective component automatically, according to input from the smart machine processor 106, or a combination thereof. In some implementations, the component controller 104 can include a data processing apparatus.

The smart machine processor 106 can include one or more processing components (alternatively referred to as "processors" or "central processing units" (CPUs)) configured to execute instructions related to one or more of the processes, steps, or actions for the driving processing platform operating on the vehicle 120. Generally, the smart machine processor 106 executes instructions and manipulates data to perform the operations of the driving processing platform. The smart machine processor 106 can receive inputs from the sensor 102 and generate commands to the component controller 104. In some cases, the smart machine processor 106 can perform autopilot operations. In some cases, the smart machine processor 106 can include a data processing apparatus. The smart machine processor 106 can also be referred to as an automated machine processor.

The communication subsystem 116 can be configured to provide wireless or wireline communication for data or control information provided by the smart machine processor 106, the sensor security evaluation application 112, or both. For example, the communication subsystem 116 can support transmissions over wireless local area network (WLAN or WiFi), near field communication (NFC), infrared (IR), Radio-frequency identification (RFID), bluetooth (FT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver. The communication subsystem 116 can support inter-vehicle communication protocols. The communication subsystem 116 can also support communication protocols for transmitting data over the network 140.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the vehicle 120 and various other computer-executable software programs for performing one or more of the processes, steps, or actions described above.

The sensor security evaluation application 112 represents an application, a set of applications, software, software modules, hardware, or any combination thereof that can be configured to determine a secure confidence score for sensor data. In some cases, the sensor security evaluation application 112 can be a software module, e.g., executed by the smart machine processor 106 or other processors on the driving processing platform of the vehicle 120. The sensor security evaluation application 112 can receive sensor data from the sensors 102, compute a security confidence score based on one or more factors, and send the security confidence score and the sensor data to the smart machine processor 106. FIGS. 2-3 and associated descriptions provide additional details of these implementations.

As illustrated, the bus 110 provides a communication interface for components of the driving processing platform operating on the vehicle 120. In some cases, the bus 110 can be implemented using a Controller Area Network (CAN) bus.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate. Furthermore, while the vehicle 120 is used as an illustrated example of an automated machine in FIG. 1, other automated machines, e.g., a smart appliance, can include similar components as the vehicle 120 and execute similar operations as described herein.

FIG. 2 is a flow diagram showing an example method 200 for providing secure sensor data, according to an implementation. The method 200 can be implemented by the entities shown in FIG. 1, including, for example, the vehicle 120

(including the components of the vehicle 120, e.g., the sensor security evaluation application 112). The method 200 shown in FIG. 2 can also be implemented using additional, fewer, or different entities. Furthermore, the method 200 shown in FIG. 2 can be implemented using additional, fewer, or different operations, which can be performed in the order shown or in a different order. In some instances, an operation or a group of operations can be iterated or repeated, for example, for a specified number of iterations or until a terminating condition is reached.

The example method 200 begins at 202, where the sensor security evaluation application that operates on a device receives sensor data from a sensor on the device. The device is an automated machine. For example, the device can be the vehicle 120 illustrated in FIG. 1. In some cases, the sensor data are received in response to a sensor data request. For example, a smart machine processor operating on the device sends a data request to the sensor security evaluation application. The sensor security evaluation application sends a query to the sensor and receive the sensor data in response. Alternatively, the smart machine processor operating on the device can send a data request to the sensor, and the sensor sends the sensor data to the sensor security evaluation application in response.

At 204, the sensor security evaluation application determines a security confidence score associated with the sensor data. The security confidence score indicates the level of trustworthiness of the sensor data. For example, a high security confidence score can indicate that the sensor data is likely to be authenticated, while a low security confidence score can indicate that the sensor data may have been compromised.

In some implementations, the sensor security evaluation application can determine the security confidence score based on one or more factors. One example factor is a vulnerability factor of the sensor. Sensors of different manufacturers or models may have different levels of exposures to malicious attacks. The Common Vulnerabilities and Exposures (CVE) system provides a reference-method for publicly known information-security vulnerabilities and exposures for different products. Accordingly, each sensor can have a CVE score that indicates the level of vulnerability of the sensor. The sensor security evaluation application can use the manufacturer, the model, the equipment identifier (ID), or other identification information of the sensor, to obtain the CVE score of the sensor. The sensor security evaluation application can convert the CVE score to a vulnerability factor of the sensor.

In some cases, the CVE score of the sensor can be stored on a memory on the device. The sensor security evaluation application can query the memory to obtain the CVE score. Alternatively, the sensor security evaluation application can generate a request message. The request message can include the identification information of the sensor, e.g., the manufacturer, the model, or the equipment identifier (ID) of the sensor. The device can transmit the request message to a security server (e.g., the security server 130 illustrated in FIG. 1). The security server can transmit the CVE score of the sensor to the device in a response message.

In some cases, instead of the CVE score, the security server can determine a vulnerability score, and transmit the vulnerability score to the device. This approach can provide one or more advantages. The CVE score is maintained by the CVE system, which may not reflect the current status of the security risks associated with a particular product. The security server can aggregate vulnerability information from different sources, including the CVE score, and determine a vulnerability score for each sensor. The security server can also enable security personnel or organizations to implement proprietary algorithms to adjust and update the vulnerability score. The sensor security evaluation application can use the vulnerability score as the vulnerability factor, or convert the vulnerability score to the vulnerability factor using a scaling factor.

Another example factor is the location factor. Some geological areas, e.g., regions or countries, may have a higher number of occurrences of security breaches. Therefore if the device is located in such an area, the sensor data may have a higher likelihood of being unsecure. On the other hand, some locations may be highly secured, and thus the device is less likely to encounter malicious manipulation on its sensor data. In some cases, the sensor security evaluation application can query a location determination unit, e.g., the GPS, on the device, to obtain the current location of the device. The sensor security evaluation application can determine a location factor based on the current location, e.g., using a look-up table that maps different locations to a location factor. Alternatively or in combination, the device can send the current location of the device to the security server, and the security server can send a location factor to the device.

Yet another example factor is a staleness factor. In some cases, software or firmware are executed on the sensor to process and generate sensor data. For example, a camera may use imaging processing software to process the images received from the lens and generate image data. A software that has been in the public domain for an extended time without being updated is likely to be exposed to heightened security risks. Accordingly, the sensor security evaluation application can determine a staleness factor of the sensor based on the release date of the software or firmware of the sensor. The sensor security evaluation application can query the sensor to obtain the release date. The sensor security evaluation application can also query the sensor to obtain a version information of the software or firmware of the sensor. The sensor security evaluation application can query the security server, using the version information, to obtain the release date from the security server. In some cases, the security server can determine a staleness factor of the sensor and send it to the device.

The sensor security evaluation application can aggregate these factors to obtain the security confidence score. Example algorithms for aggregating the factors include summing, averaging, weighted averaging, taking the minimum or maximum factor, or any combinations thereof.

At 206, the sensor security evaluation application transmits the security confidence score and the sensor data to the smart machine processor. The smart machine processor can use the sensor data according to the security confidence score. In one example, if the security confidence score is below a threshold, the smart machine processor may discard the sensor data so that data having high security risks do not result in dangerous operating commands for the device. Alternatively or in addition, sensor data are weighted by the associated security confidence score when used by the smart machine processor to generate operating commands. Therefore, data having relatively high security risks would have a reduced impact in generating operating commands. In some cases, the threshold for the security confidence score of the sensor data can be different for different types of sensor data. For example, for sensor data that provides less important information, e.g., the sensor data that generates road traffic information around a vehicle, the threshold can be low or zero. The smart machine processor can use the sensor data even if the data may not be secure. On the other hand, for sensor data related to auto-driving inputs, the threshold can be high.

FIG. 3 is a high-level architecture block diagram showing a server 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the server 302 and other devices. The network 350 can be a wireless or a wireline network, a memory pipe, a hardware connection, or any internal or external communication paths between the components.

The server 302 includes a computing system configured to perform the algorithm described in this disclosure to process resource requests. For example, the server 302 can be used to implement the security server 130 shown in FIG. 1. In some cases, the algorithm can be implemented in an executable computing code, e.g., C/C++ executable codes. Alternatively, or in combination, the algorithm can be implemented in an application program, e.g., EXCEL. In some cases, the server 302 can include a standalone Linux system that runs batch applications. In some cases, the server 302 can include mobile or personal computers that run the application program.

The server 302 may include an input device, such as a keypad, keyboard, touch screen, microphone, speech recognition device, or another device that can accept user information, and/or an output device that conveys information associated with the operation of the server 302, including digital data, visual and/or audio information, or a GUI.

The server 302 can serve as a client, network component, a server, a database or other persistency, or the like. In some implementations, one or more components of the server 302 may be configured to operate within a cloud-computing-based environment.

At a high level, the server 302 is an electronic computing device operable to receive, transmit, process, store, or manage data and information. According to some implementations, the server 302 may also include or be communicably coupled with an application server, e-mail server, web server, caching server, streaming data server, business intelligence (BI) server, and/or other server.

The server 302 can receive requests over network 350 from a client application (e.g., executing on a user device) and respond to the received requests by processing said requests in an appropriate software application. In addition, requests may also be sent to the server 302 from internal users (e.g., from a command console or by another appropriate access method), external or third parties, other automated applications, as well as any other appropriate entities, individuals, systems, or computers.

Each of the components of the server 302 can communicate using a system bus 303. In some implementations, any and/or all the components of the server 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the server 302. The functionality of the server 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the server 302, alternative implementations may illustrate the API 312 and/or the service layer 313 as stand-alone components in relation to other components of the server 302. Moreover, any or all parts of the API 312 and/or the service layer 313 may be implemented as child or sub-modules of another software module or hardware module, without departing from the scope of this disclosure.

The server 302 includes an interface 304. Although illustrated as a single interface 304 in FIG. 3, two or more interfaces 304 may be used according to particular needs, configurations, or particular implementations of the server 302. The interface 304 is used by the server 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The server 302 includes a processor 305. Although illustrated as a single processor 305 in FIG. 3, two or more processors may be used according to particular needs, configurations, or particular implementations of the server 302. Generally, the processor 305 executes instructions and manipulates data to perform the operations of the server 302. In some cases, the processor 305 can include a data processing apparatus.

The server 302 also includes a memory 306 that holds data for the server 302. Although illustrated as a single memory 306 in FIG. 3, two or more memories may be used according to particular needs, configurations, or particular implementations of the server 302. While memory 306 is illustrated as an integral component of the server 302, in alternative implementations, memory 306 can be external to the server 302.

The application 307 comprises an algorithmic software engine providing functionality according to particular needs, configurations, or particular implementations of the server 302. Although illustrated as a single application 307, the application 307 may be implemented as multiple applications 307 on the server 302. In addition, although illustrated as integral to the server 302, in alternative implementations, the application 307 can be external to the server 302.

Further, the terms "client," "user," and other appropriate terminology may be used interchangeably, as appropriate, without departing from the scope of this disclosure. Moreover, this disclosure contemplates that many users may use one server 302, or that one user may use multiple servers 302.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A computer-implemented method to perform autopilot operations for controlling an autonomous vehicle, comprising:
receiving, at a sensor security evaluation application executing on a vehicle, sensor data from a hardware sensor on the vehicle;

in response to receiving the sensor data, transmitting, by the sensor security evaluation application executing on the vehicle, a request to a security server for vulnerability data associated with the hardware sensor, wherein the request indicates a manufacturer or a model of the hardware sensor;

in response to the request, receiving, by the sensor security evaluation application and from the security server, a response including the vulnerability data associated with the hardware sensor that is determined based on the manufacturer or the model of the hardware sensor;

determining, by the sensor security evaluation application, a vulnerability factor based on the vulnerability data associated with the hardware sensor;

determining, by the sensor security evaluation application, a security confidence score associated with the hardware sensor based on the vulnerability factor, wherein the security confidence score indicates trustworthiness of the sensor data;

transmitting, from the sensor security evaluation application, the security confidence score and the sensor data to a smart machine processor on the vehicle, wherein the smart machine processor is an autopilot processor;

differentiating the sensor data based on the security confidence score;

generating, by the autopilot processor, an operating autopilot command of the vehicle based on the sensor data and security confidence score; and controlling the vehicle according to the operating autopilot command using the differentiated sensor data.

2. The method of claim 1, wherein the security confidence score is determined further based on a location factor.

3. The method of claim 2, further comprising:
determining a current location of the vehicle; and
determining the location factor based on the current location of the vehicle.

4. The method of claim 1, wherein the vulnerability factor is determined based on a Common Vulnerabilities and Exposures (CVE) score of the hardware sensor.

5. The method of claim 1, wherein the security confidence score is determined based on a staleness factor.

6. A vehicle, comprising:
a hardware sensor;
at least one hardware processor; and
a computer-readable storage medium coupled to the at least one hardware processor and storing programming instructions for execution by the at least one hardware processor, wherein the programming instructions, when executed, cause the at least one hardware processor to perform operations comprising:
receiving sensor data from the hardware sensor;
in response to receiving the sensor data, transmitting a request to a security server for vulnerability data associated with the hardware sensor, wherein the request indicates a manufacturer or a model of the hardware sensor;
in response to the request, receiving, from the security server, a response including the vulnerability data associated with the hardware sensor that is determined based on the manufacturer or the model of the hardware sensor;
determining a vulnerability factor based on the vulnerability data associated with the hardware sensor;
determining a security confidence score associated with the hardware sensor based on the vulnerability factor, wherein the security confidence score indicates trustworthiness of the sensor data;
differentiating the sensor data based on the security confidence score;
generating an operating autopilot command of the vehicle based on the sensor data and security confidence score; and
controlling the vehicle according to the operating autopilot command using the differentiated sensor data.

7. The vehicle of claim 6, wherein the security confidence score is determined further based on a location factor.

8. The vehicle of claim 7, the operations further comprising:
determining a current location of the vehicle; and
determining the location factor based on the current location of the vehicle.

9. The vehicle of claim 6, wherein the vulnerability factor is determined based on a Common Vulnerabilities and Exposures (CVE) score of the hardware sensor.

10. The vehicle of claim 6, wherein the security confidence score is determined based on a staleness factor.

11. A non-transitory computer-readable medium storing instructions which, when executed, cause a vehicle to perform operations comprising:
receiving, at a sensor security evaluation application executing on the vehicle, sensor data from a hardware sensor on the vehicle;
in response to receiving the sensor data, transmitting, by the sensor security evaluation application executing on the vehicle, a request to a security server for vulnerability data associated with the hardware sensor, wherein the request indicates a manufacturer or a model of the hardware sensor;
in response to the request, receiving, by the sensor security evaluation application and from the security server, a response including the vulnerability data associated with the hardware sensor that is determined based on the manufacturer or the model of the hardware sensor;
determining, by the sensor security evaluation application, a vulnerability factor based on the vulnerability data associated with the hardware sensor;
determining, by the sensor security evaluation application, a security confidence score associated with the hardware sensor based on the vulnerability factor, wherein the security confidence score indicates trustworthiness of the sensor data;
transmitting, from the sensor security evaluation application, the security confidence score and the sensor data to a smart machine processor on the vehicle, wherein the smart machine processor is an autopilot processor;
differentiating the sensor data based on the security confidence score;
generating, by the autopilot processor, an operating autopilot command of the vehicle based on the sensor data and security confidence score; and
controlling the vehicle according to the operating autopilot command using the differentiated sensor data.

12. The non-transitory computer-readable medium of claim 11, wherein the security confidence score is determined further based on a location factor.

13. The non-transitory computer-readable medium of claim 12, the operations further comprising:
determining a current location of the vehicle; and
determining the location factor based on the current location of the vehicle device.

14. The non-transitory computer-readable medium of claim 11, wherein the vulnerability factor is determined based on a Common Vulnerabilities and Exposures (CVE) score of the hardware sensor.

15. The non-transitory computer-readable medium of claim 11, wherein the security confidence score is determined based on a staleness factor.

\* \* \* \* \*